No. 889,481.

PATENTED JUNE 2, 1908.

T. J. MURPHY.
GRINDSTONE ATTACHMENT.
APPLICATION FILED MAR. 7, 1908.

2 SHEETS—SHEET 1.

Witnesses
J. G. Strickel
B. C. Rust

Inventor
T. J. Murphy
by Foster Freeman Watson &c
Attorneys

No. 889,481.
PATENTED JUNE 2, 1908.
T. J. MURPHY.
GRINDSTONE ATTACHMENT
APPLICATION FILED MAR. 7, 1908.
2 SHEETS—SHEET 2.
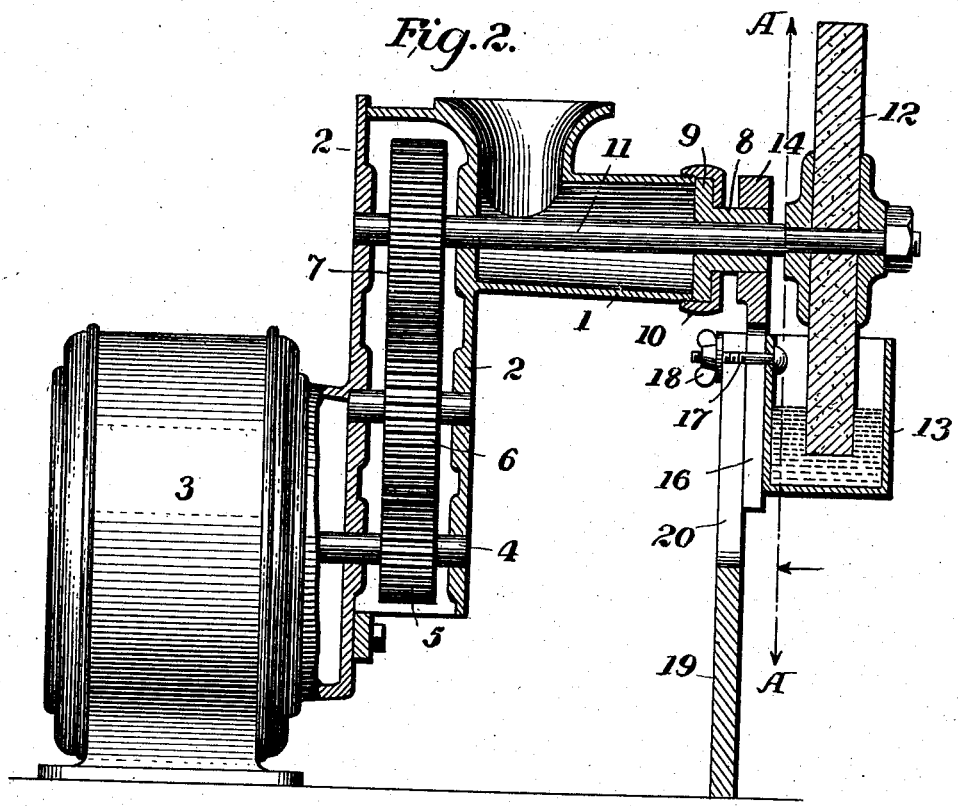
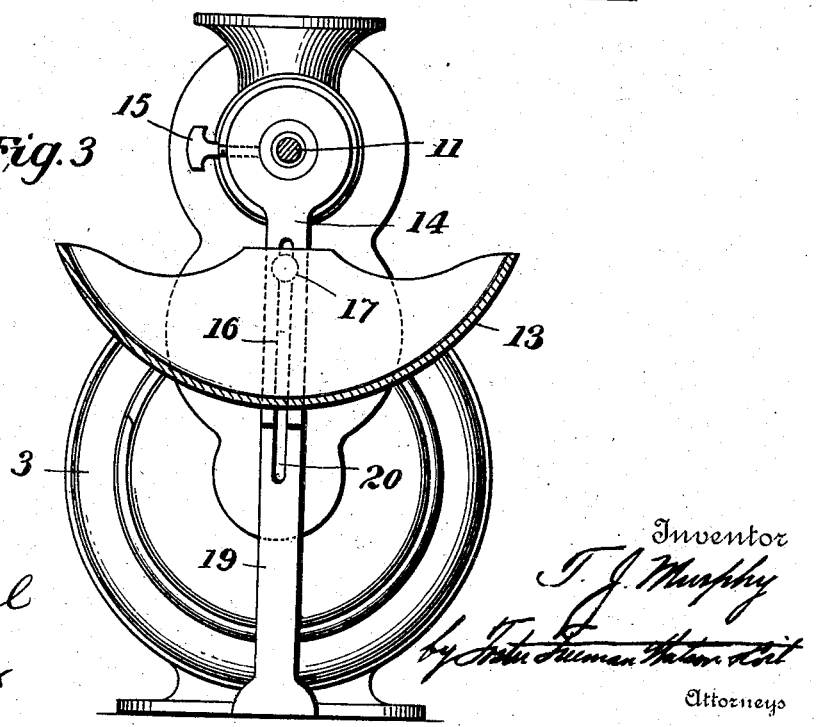

UNITED STATES PATENT OFFICE.

THOMAS J. MURPHY, OF NEW BEDFORD, MASSACHUSETTS.

GRINDSTONE ATTACHMENT.

No. 889,481.  Specification of Letters Patent.  Patented June 2, 1908.

Application filed March 7, 1908. Serial No. 419,712.

*To all whom it may concern:*

Be it known that I, THOMAS J. MURPHY, a citizen of the United States, and resident of New Bedford, Bristol county, State of Massachusetts, have invented certain new and useful Improvements in Grindstone Attachments, of which the following is a specification.

The object of the invention is to provide means for connecting a grindstone to the casing or frame of a machine having a rotary shaft, and driving the same with the power devices of such machine.

The invention is particularly adapted to machines having knives which require frequent sharpening, such as meat cutting machines, and it will be described in connection with a machine of this class.

Figure 1:
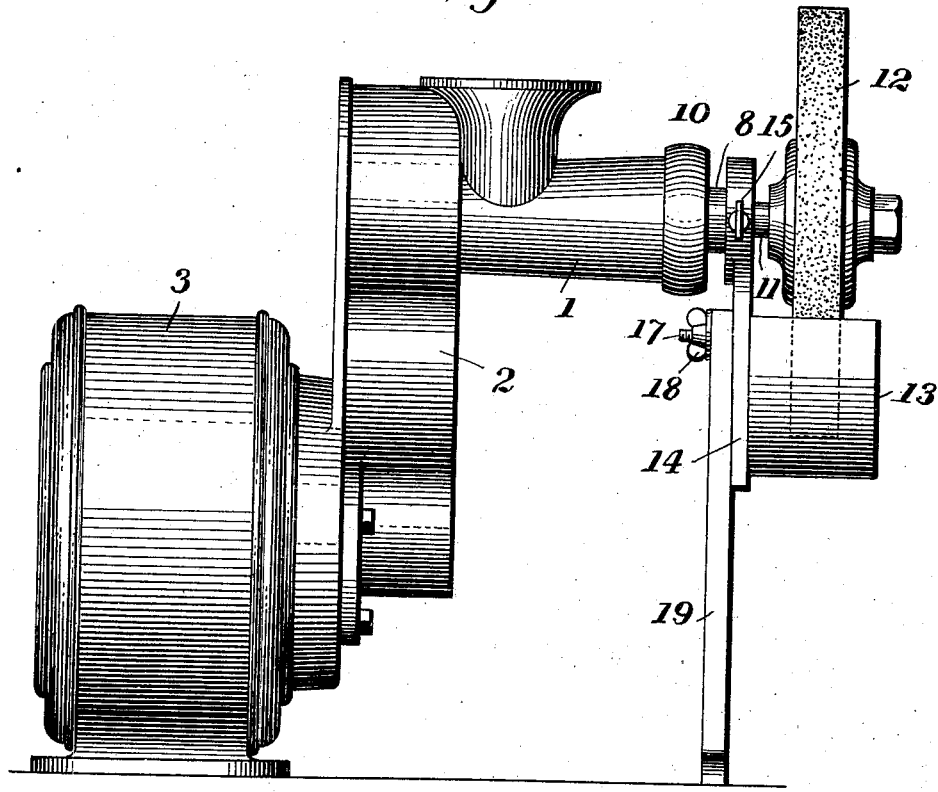
Figure 4:
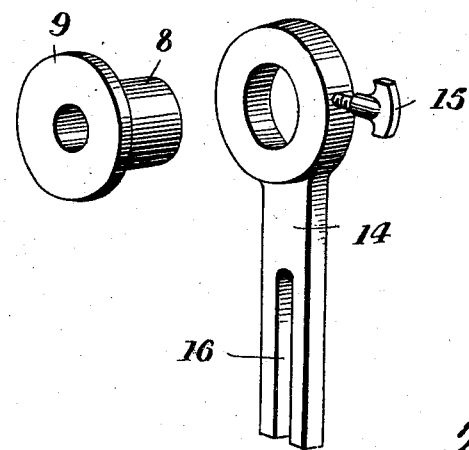

In the accompanying drawing, Figure 1 is a side elevation of an attachment constructed in accordance with the present invention showing the same in position for use; Fig. 2 is a longitudinal sectional view through the machine; Fig. 3 is an elevation on the line A—A of Fig. 2; Fig. 4 is a detail view of the removable shaft bearing and hanger for the liquid receptacle.

Referring to the drawings, 1 designates the casing of a meat cutting or grinding machine of that class or type in which the meat is fed longitudinally through a cylindrical body and cut by knives mounted on a shaft journaled in bearings in the opposite ends of the casing. In the particular machine illustrated the cylinder or casing 1 is carried by a frame 2 supported from the casing 3 of an electric motor. The armature shaft 4 of the motor carries a pinion 5 which, through an intermediate gear 6, journaled in bearings in the frame 2, transmits movement to the driving gear 7 with which the cutter carrying shaft of the machine is adapted to be detachably connected.

To apply the attachment constituting the present invention, the perforated cap, which closes the discharge end of the casing 1, as well as the cutting blades and their supporting shaft, are removed and a shaft bearing 8 is securely fastened to the discharge end of the casing. As shown this bearing 8 has at its inner end a disk-like flange 9 which is surrounded by a collar 10 having an internally threaded portion engaging threads on the casing 1, whereby the flange 9 may be held in close contact with the end of the casing. The shaft 11 supporting the grindstone 12 is mounted in the bearing 8 and in the bearings provided at the opposite end of the casing 1 for supporting the shaft of the grinding knives. The shaft 11 is provided with means whereby it will be firmly connected with the gear 7 when properly inserted in its bearings. For instance, said shaft may be made polygonal in cross-section at that part which receives the gear 7.

In using the grindstone it is of course desirable to apply liquid to the periphery thereof and for this purpose the lower portion of the stone is caused to travel through a trough-like receptacle 13 which is supported in such manner that it may be adjusted vertically. As shown a hanger 14 has at its upper end an eye surrounding the shaft bearing 8 and is adapted to be held fast on said bearing by a thumb screw 15. In the lower portion of the hanger is formed a longitudinally extending slot 16 through which extends a bolt 17 attached to one wall of the receptacle 13 and provided at its outer end with a winged nut 18. To provide a more firm and stable support for the liquid receptacle a leg or standard 19 is preferably employed, the upper portion of said leg having therein a longitudinal slot 20 through which the bolt 17 extends. The lower end of the leg 19 is expanded to form a base or foot 21 which rests upon the counter or other support on which the motor 3 is arranged.

It will be seen that by the means described the shaft 11 of the grindstone can be readily substituted for the knife supporting shaft of the grinding machine and connected with the power devices of such machine to be rotated thereby. By disengaging the collar 10 from the casing 1 the shaft 11 can be withdrawn from the casing and the parts of the machine which have been removed readily restored. The hanger 14 and leg 19 also serve to provide a firm support for the shaft bearing 8, as well as to support the liquid receptacle.

Having described the invention what is claimed and desired to be secured by Letters Patent is, 1. The combination with the casing and power devices of a machine of the class described, of a shaft bearing detachably supported at one end of the casing, a grindstone, a shaft supporting the grindstone and journaled in said bearing, a hanger supported by said bearing, and a vertically adjustable liquid receptacle connected with said hanger and into which the lower portion of the grindstone extends.

2. The combination with the casing and power devices of a machine of the class described, of a shaft bearing detachably supported at the discharge end of the casing, a grindstone, a shaft supporting the grindstone and journaled in said bearing and in the bearing at the opposite end of the casing, and connected with the power devices of the machine to be rotated thereby, a hanger depending from the shaft bearing at the discharge end of the casing, and a support adjustably connected with said hanger.

3. The combination with the casing and power devices of a machine of the class described, of a shaft bearing detachably supported by the discharge end of the casing, a grindstone, a shaft supporting the grindstone and journaled in said bearing and in the bearing at the opposite end of the casing, and connected with the power devices of the machine to be rotated thereby, a hanger connected with the shaft bearing at the discharge end of the casing and having a longitudinally extending slot formed in its body, a liquid receptacle adapted to receive the lower portion of the grindstone, and a bolt extending from said receptacle through the slot in the hanger and adapted to be secured at any desired position in said slot.

4. The combination with the casing and power devices of a machine of the class described, of a shaft bearing detachably supported by the discharge end of the casing, a grindstone, a shaft supporting the grindstone and journaled in said bearing and in the bearing at the opposite end of the casing, and connected with the power devices of the machine to be rotated thereby, a liquid receptacle adapted to receive the lower portion of the grindstone, and a longitudinally extensible support, one member of which is connected with the shaft bearing at the discharge end of the machine casing.

5. The combination with the casing and power devices of a machine of the class described, of a shaft bearing having a disk-like flange at one end, a sleeve surrounding the bearing and engaging the machine casing to hold the bearing against the discharge end of the casing, a grindstone, a shaft supporting the grindstone and mounted in said bearing, and a liquid receptacle into which the lower portion of the grindstone extends.

In testimony whereof I affix my signature in presence of two witnesses.

THOMAS J. MURPHY.

Witnesses:
J. P. DORAN,
EUGENE H. SULLIVAN, Jr.